Oct. 18, 1927. 1,645,536
M. LOCK
ARRANGEMENT FOR COUPLING HIGH FREQUENCY APPARATUS TO
POWER TRANSMISSION LINES
Filed July 17, 1924
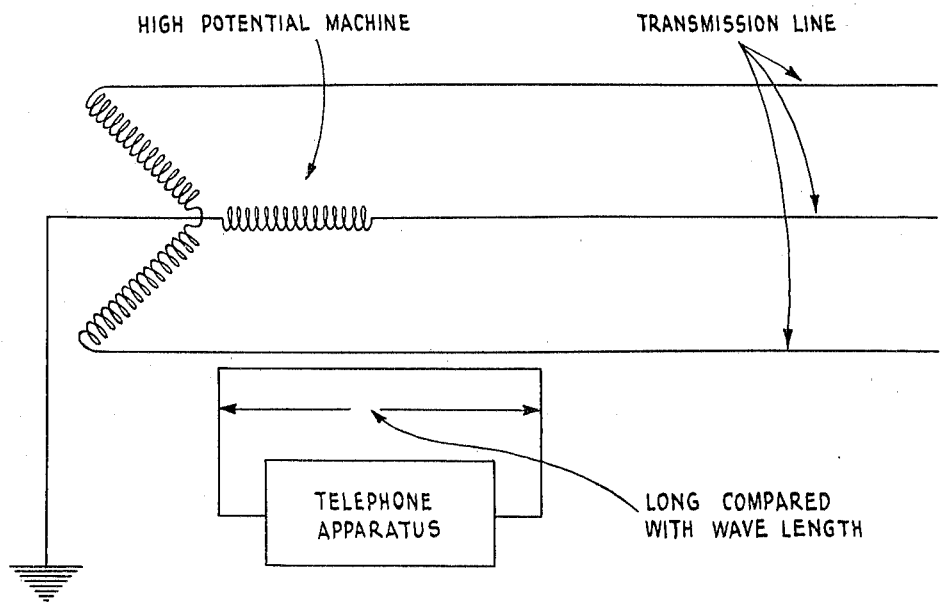
MICHAEL LOCK
INVENTOR
BY *Ira J. Adams*
ATTORNEY Patented Oct. 18, 1927.

1,645,536

UNITED STATES PATENT OFFICE.

MICHAEL LOCK, OF BERLIN, GERMANY, ASSIGNOR TO GESELLSCHAFT FÜR DRAHT-LOSE TELEGRAPHIE M. B. H., OF BERLIN, GERMANY, A CORPORATION OF GERMANY.

ARRANGEMENT FOR COUPLING HIGH-FREQUENCY APPARATUS TO POWER-TRANSMISSION LINES.

Application filed July 17, 1924, Serial No. 726,617, and in Germany August 11, 1923.

There are three principal methods according to which alternating current carrier energy is transferred to existing wire systems. According to one method, a coil with a smaller or greater winding area is arranged so that the magnetic field generated by the alternating current flowing through it, partly encloses the line wires, and consequently the carrier energy is transferred by a purely inductive effect.

According to the second method, the alternating current is transferred to the line wires by means of condensers.

The third method employs an auxiliary wire, one end of which is free similar to a single wire L-antenna near each line wire. These auxiliary wires are excited by the alternating current carrier wave, so that they oscillate in the frequency of the alternating current to be transferred. The energy is translated to the wire lines by means of the coupling between the auxiliary wires and the line wires.

As practice has shown, all these methods have not sufficiently good efficiency. The present invention relates to an arrangement for transferring alternating current energy to wire systems, particularly for the purpose of telephony guided by wires. According to the invention, a closed current path is made for the alternating carrier current and arranged near the wire system. The essential characteristic of this path is that its dimension is large with regard to the employed wavelength as shown by the single figure which is considered the preferred embodiment of the invention.

This arrangement is not identical with a wire extended near each line open at one end and acting as an antenna; nor is it identical with that arrangement according to which a coil of larger or smaller dimension acts inductively upon the wire system. The relations here are different, resulting from the fact that the dimensions of the arrangement for transferring energy are large compared with the wavelength, that is, the employed circuit is closed and the distribution of current varies along the line.

It is hereby attained that the current of this transferring arrangement is specially favorably utilized for the inductive coupling and that at the same time a capacitive effect exists. In employing a wire with one open end, the capacitive coupling only is substantially effective, and in using a coil the inductive coupling only is substantially effective. On the other hand the application of the system according to the invention guarantees an effective combination of both kinds of coupling.

Having described my invention, I claim:

1. Arrangement for coupling high frequency apparatus to a transmission line comprising a transmission line, high frequency apparatus, a conductor forming a closed circuit with said apparatus and extending in part parallel to a conductor of said transmission line for a distance which is large compared to the wave length of said apparatus.

2. In a system for transmitting high frequency oscillations over a power transmission line, the combination of means to generate high frequency oscillations, a loop having a portion thereof greater in length than the wave length of the said oscillations associated with said transmission line, whereby said oscillations are impressed upon said transmission line.

MICHAEL LOCK.